United States Patent
Ono

(10) Patent No.: US 8,953,069 B2
(45) Date of Patent: Feb. 10, 2015

(54) IMAGE CAPTURING MODULE AND IMAGE CAPTURING APPARATUS WITH MULTIPLE IMAGE CAPTURING SYSTEMS OF MULTIPLE WAVELENGTH REGIONS

(75) Inventor: Shuji Ono, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 628 days.

(21) Appl. No.: 13/211,814

(22) Filed: Aug. 17, 2011

(65) Prior Publication Data

US 2012/0044393 A1 Feb. 23, 2012

(30) Foreign Application Priority Data

Aug. 19, 2010 (JP) ................................ 2010-184306

(51) Int. Cl.
*H04N 9/09* (2006.01)
*H04N 5/225* (2006.01)
*H04N 9/04* (2006.01)

(52) U.S. Cl.
CPC ............. *H04N 5/2254* (2013.01); *H04N 9/045* (2013.01)
USPC ........................................................ 348/265

(58) Field of Classification Search
CPC . H04N 9/09; H04N 5/2258; H04N 2209/049; H04N 1/486
USPC ........................................................ 348/265
See application file for complete search history.

(56) References Cited

U.S. PATENT DOCUMENTS

| | | | | |
|---|---|---|---|---|
| 8,471,936 B2* | 6/2013 | Ming et al. | ..................... | 348/265 |
| 8,478,123 B2* | 7/2013 | Cao et al. | ..................... | 396/333 |
| 8,542,290 B2* | 9/2013 | Ogasahara | ................. | 348/222.1 |
| 2004/0263994 A1 | 12/2004 | Sayag | | |
| 2005/0146634 A1 | 7/2005 | Silverstein et al. | | |
| 2005/0285955 A1* | 12/2005 | Utz et al. | ..................... | 348/265 |
| 2010/0066854 A1 | 3/2010 | Mather et al. | | |
| 2010/0165156 A1* | 7/2010 | Mingam | ........................ | 348/262 |
| 2011/0043665 A1* | 2/2011 | Ogasahara | .................... | 348/241 |

FOREIGN PATENT DOCUMENTS

| | | |
|---|---|---|
| JP | 2003-18445 A | 1/2003 |
| JP | 2005-303694 A | 10/2005 |
| JP | 2006128762 A | 5/2006 |
| JP | 2007156749 A | 6/2007 |
| JP | 2009278577 A | 11/2009 |

OTHER PUBLICATIONS

Office Action, dated Oct. 22, 2013, issued in corresponding JP Application No. 2010-184306, 5 pages in English and Japanese.
Communication, dated Dec. 10, 2014, issued in corresponding EP Application No. 11176659.8, 6 pages in English.

* cited by examiner

*Primary Examiner* — Gary C Vieaux
(74) *Attorney, Agent, or Firm* — Sughrue Mion, PLLC

(57) ABSTRACT

A subject image with little blur is provided even when the subject exists in a wide range of distance. An image capturing module includes: a plurality of image capturing systems, each including an optical system and capturing a an image of a subject by light in a wavelength region different from each other to generate a wavelength component signal representing an image of light in the corresponding wavelength region; and an image generating section that combines the wavelength component signals generated by the plurality of image capturing systems thereby generating an image signal representing an image of the subject, where an image capturing system, from among the plurality of image capturing systems, which generates a wavelength component signal having a greater contribution to brightness in the image of the subject includes an optical system having a deeper focal depth.

12 Claims, 7 Drawing Sheets

IMAGE CAPTURING MODULE AND IMAGE CAPTURING APPARATUS WITH MULTIPLE IMAGE CAPTURING SYSTEMS OF MULTIPLE WAVELENGTH REGIONS

The contents of the following Japanese patent application are incorporated herein by reference, No. 2010-184306 filed on Aug. 19, 2010.

BACKGROUND

1. Technical Field

The present invention relates to an image capturing module and an image capturing apparatus.

2. Related Art

A pantoscopic image capturing apparatus that achieves both of wide angle and high resolution performances with simple image processing is known (for example as described in Patent Document No. 1). In addition, an image capturing apparatus that includes two independent image capturing optical systems, receives light from these two image capturing optical systems independently, and outputs image capturing signals by capturing images of a subject independently is already known (for example as described in Patent Document No. 2). The following shows the specifics of the patent documents cited above.

Patent Document No. 1: Japanese Patent Application Publication No. 2005-303694

Patent Document No. 2: Japanese Patent Application Publication No. 2003-18445

SUMMARY

The focal depth becomes shallow when using a bright optical system. In the conventional techniques, when the subject exists in a wide range of distance, the image of a defocused subject becomes blurred to a great extent.

Therefore, according to a first aspect of the innovations herein, provided is an image capturing module including: a plurality of image capturing systems, each including an optical system and capturing a an image of a subject by light in a wavelength region different from each other to generate a wavelength component signal representing an image of light in the corresponding wavelength region; and an image generating section that combines the wavelength component signals generated by the plurality of image capturing systems thereby generating an image signal representing an image of the subject, where an image capturing system, from among the plurality of image capturing systems, which generates a wavelength component signal having a greater contribution to brightness in the image of the subject includes an optical system having a deeper focal depth.

The configuration is also possible in which the image generating section generates a brightness signal of the image signal, by combining the wavelength component signals generated by the plurality of image capturing systems according to pre-set weights corresponding to respective wavelength regions, and an image capturing system, from among the plurality of image capturing systems, which performs image capturing by light in a wavelength region corresponding to a larger weight includes an optical system having a deeper focal depth.

First image capturing systems, which generate a wavelength component signal having the greatest contribution to the brightness, may be the greatest in number among the plurality of image capturing systems.

The image generating section may generate a single wavelength component signal by combining the wavelength component signals generated by the plurality of first image capturing systems, and generates the image signal by combining the single wavelength component signal with the other wavelength component signals.

An image capturing system generating a wavelength component signal having a greater contribution to the brightness may include an optical system having a larger F value. An image capturing system generating a wavelength component signal having a greater contribution to the brightness may include an optical system having a smaller diaphragm.

The configuration is also possible in which the plurality of image capturing systems include at least three image capturing systems respectively capturing light in R, G, and B wavelength regions, and one or more image capturing systems capturing light in the G wavelength region include an optical system having a focal depth deeper than the optical systems included in the other image capturing systems.

The configuration is also possible in which any optical system included in image capturing systems capturing light in wavelength regions other than the G wavelength region is an image forming optical system, and the one or more image capturing systems capturing light in the G wavelength region includes an optical system providing substantially the same spread to light from the subject positioned in a pre-set range of distance in an optical axis direction.

The image generating section may combine the wavelength component signals generated by the plurality of image capturing systems, by aligning a subject image on the image based on optical axis positions of the optical systems respectively included in the plurality of image capturing systems.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
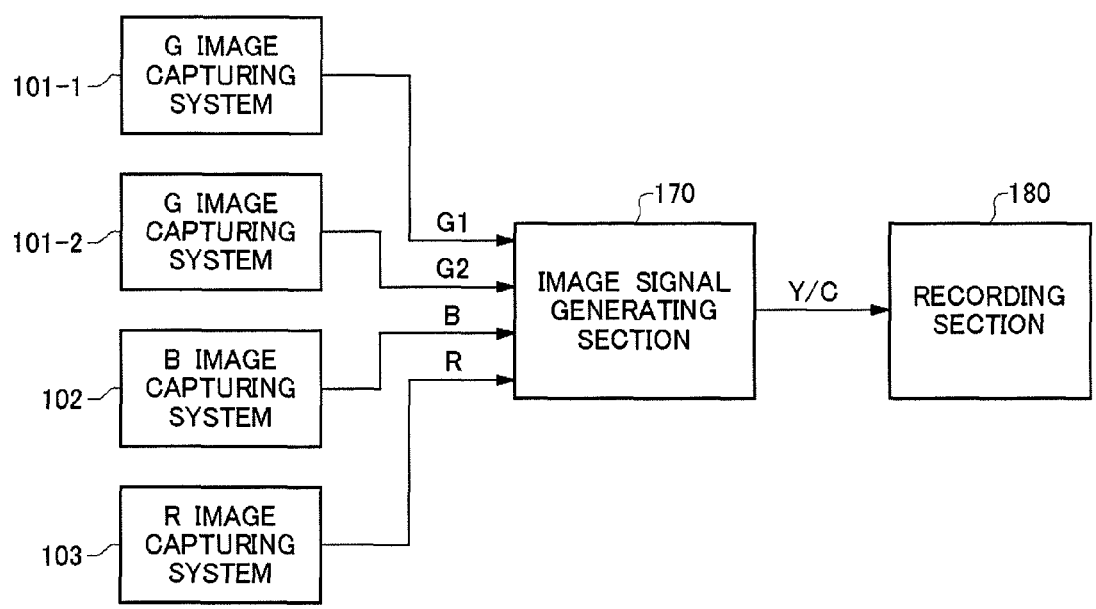
FIG. 1 schematically shows an exemplary block configuration of an image capturing apparatus 100.

FIG. 1 schematically shows an exemplary block configuration of an image capturing apparatus 100. The image capturing apparatus 100 according to the present embodiment provides a subject image with little blur. The image capturing apparatus 100 includes a first image capturing system 101-1, a first image capturing system 101-2, a second image capturing system 102, a third image capturing system 103, an image signal generating section 170, and a recording section 180. The first image capturing system 101-1 and the first image capturing system 101-2 are occasionally collectively referred to as "first image capturing system 101." The first image capturing system 101, the second image capturing system 102, the third image capturing system 103, and the image signal generating section 170 function as an image capturing module incorporated in the image capturing apparatus 100.

The first image capturing system 101-1 and the first image capturing system 101-2 are G image capturing systems performing image capturing by means of G light in a green wavelength region. The second image capturing system 102 is a B image capturing system performing image capturing by means of B light in a blue wavelength region. The third image capturing system 103 is an R image capturing system performing image capturing by means of R light in a red wavelength region. In this way, the image capturing apparatus 100 includes a plurality of image capturing systems including three image capturing systems respectively performing image capturing by means of light in R, G, and B wavelength regions.

The first image capturing system 101-1 outputs, to the image signal generating section 170, an image capturing signal G1 being a wavelength component signal representing an image by means of G light. The first image capturing system 101-2 outputs, to the image signal generating section 170, an image capturing signal G2 being a wavelength component signal representing an image by means of G light. The second image capturing system 102 outputs, to the image signal generating section 170, an image capturing signal B being a wavelength component signal representing an image by means of B light. The third image capturing system 103 outputs, to the image signal generating section 170, an image capturing signal R being a wavelength component signal representing an image by means of R light.

The image signal generating section 170 generates a brightness signal Y and a color signal C using an image capturing signal G1, an image capturing signal G2, an image capturing signal B, and an image capturing signal R. The image signal generating section 170 supplies the brightness signal Y and the color signal C to the recording section 180.

The recording section 180 records the image signal generated by the image signal generating section 170. The recording section 180 may record, to a nonvolatile memory, an image that the image signal supplied from the image signal generating section 170 represents. The nonvolatile memory may be included in the recording section 180. Alternatively, the nonvolatile memory may be an external memory provided detachable to the image capturing apparatus 100. The recording section 180 may output an image outside the image capturing apparatus 100.

The image capturing apparatus 100 may be image capturing appliances such as a portable telephone having a camera function, and a digital camera. The image capturing module including the first image capturing system 101, the second image capturing system 102, the third image capturing system 103, and the image signal generating section 170 can be provided as a camera module for these image capturing appliances.

Figure 2:
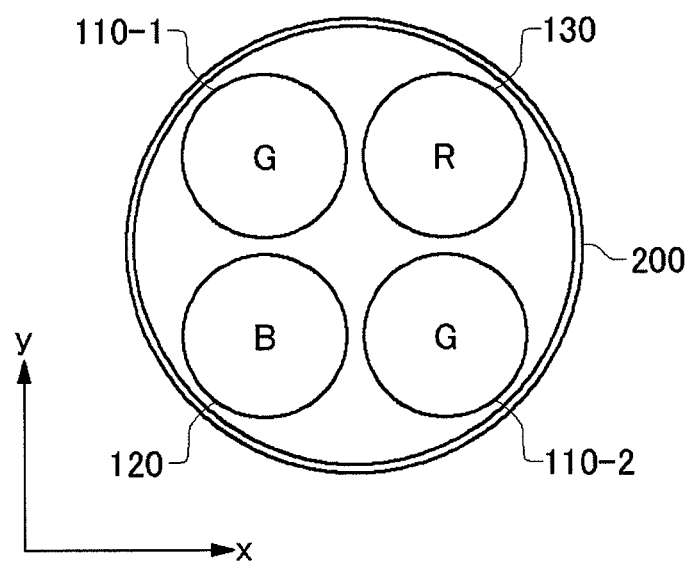
FIG. 2 shows an exemplary positional relation among the image capturing systems of the image capturing apparatus 100.

FIG. 2 shows an exemplary positional relation among the image capturing systems of the image capturing apparatus 100. In this drawing, the positional relation among the image capturing systems is represented by the arrangement of lenses included in the image capturing systems. The present drawing shows an exemplary lens arrangement when observed from the object-side.

The first lens 110-1 included in the first image capturing system 101-1, the first lens 110-2 included in the first image capturing system 101-2, the second lens 120 included in the second image capturing system 102, and the third lens 130 included in the third image capturing system 103 are provided inside a lens barrel 200. Note that the first lens 110-1 and the first lens 110-2 are occasionally collectively referred to as "first lens 110."

The first lens 110-1 and the first lens 110-2 are provided to be distant from each other in both of the x direction and y direction. The distance between the first lens 110-1 and the first lens 110-2 in the x direction is assumed to be substantially the same as the distance therebetween in the y direction.

The second lens 120 is provided to be distant from the first lens 110-1 in the y direction. The second lens 120 is provided to be distant from the first lens110-2 n the x direction. The third lens 130 is provided to be distant from the first lens 110-1 in the x direction. The third lens 130 is provided to be distant from the first lens 110-2 in the y direction.

In this way, the image capturing apparatus 100 includes a lens apparatus including the first lens 110-1, the first lens 110-2, the second lens 120, the third lens 130, and the lens barrel 200. The middle point between the optical axis of the first lens 110-1 and the optical axis of the first lens 110-2 matches the middle point between the optical axis of the second lens 120 and the optical axis of the third lens 130. The middle point is occasionally referred to as the center of the lens apparatus.

The optical axis of the first lens 110-1, the optical axis of the first lens 110-2, the optical axis of the second lens 120, and the optical axis of the third lens 130 are set to be parallel to each other. In other words, the image capturing optical axis of the first image capturing system 110-1, the image capturing optical axis of the first image capturing system 101-2, the image capturing optical axis of the second image capturing system 102, and the image capturing optical axis of the third image capturing system 103 are parallel to each other, and on a plane vertical to the image capturing optical axes of these image capturing systems, the image capturing optical axes are on different positions respectively.

Figure 3:
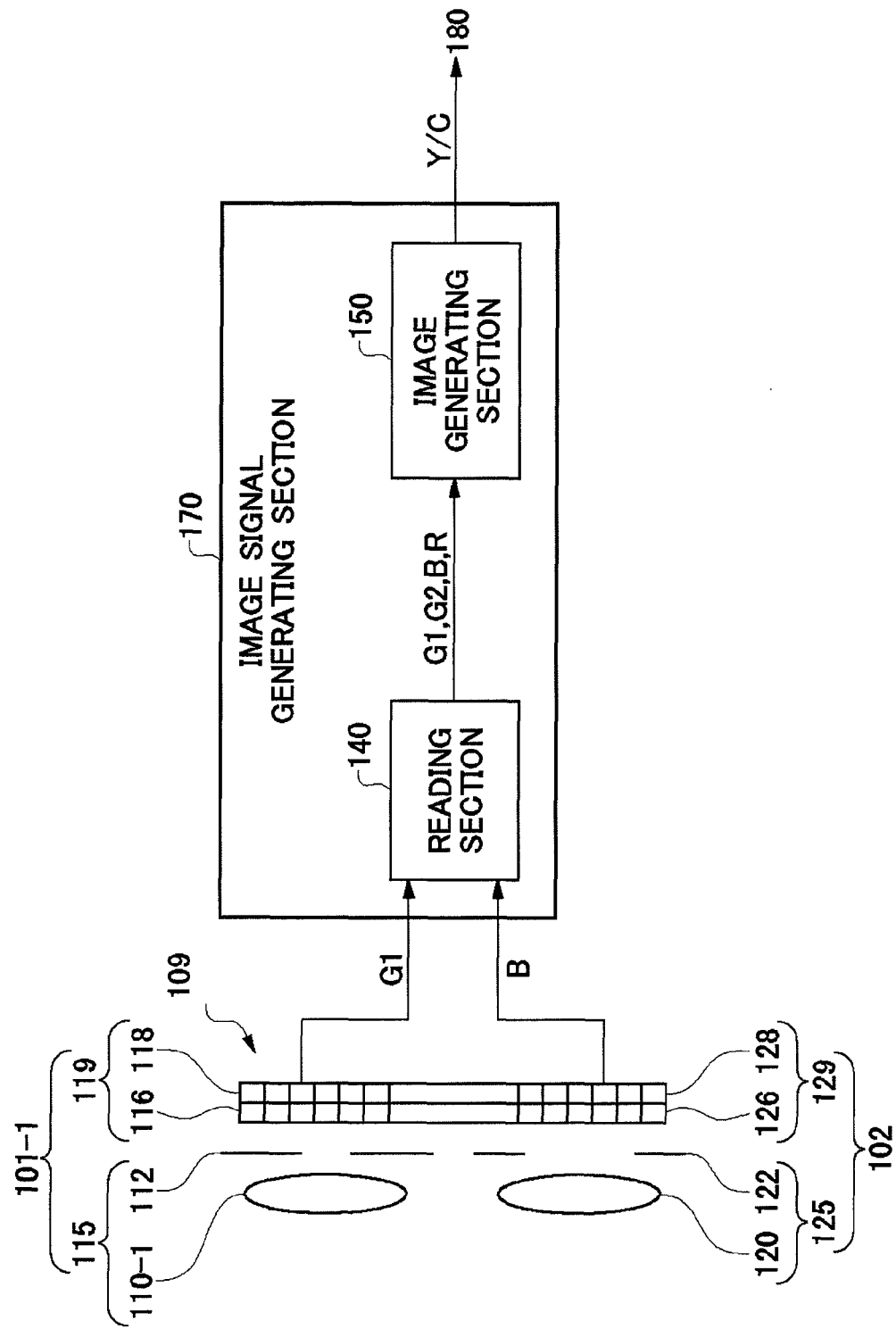
FIG. 3 schematically shows an exemplary block configuration of an image capturing module.

FIG. 3 schematically shows an exemplary block configuration of an image capturing module included in the image capturing apparatus 100. The block configuration of the first image capturing system 101-1 and the second image capturing system 102 is shown as a schematic cross sectional diagram taken on a plane including the optical axes of the first image capturing system 101-1 and the second image capturing system 102 is shown. The image signal generating section 170 includes a reading section 140 and an image generating section 150.

The first image capturing system 101-1 capturing a subject by means of G light can capture an image at a deeper focal depth than the second image capturing system 102 capturing a subject by means of B light. By causing the G image capturing system to have a deeper focal depth than the B image capturing system, the amount of blur can be reduced for the same defocusing the G image signal rather than the B image signal. Since the visibility of the eyes of human beings is the highest in the green wavelength region, even when the amount of blur with the B image signal is large, if the amount of blur with the G image signal is small, the human eyes often see the image clearly. Therefore, the image capturing apparatus 100 can provide an image not greatly blurred even when the subject exists in a relatively wide range of distance.

The first image capturing system 101-1 includes a first optical system 115 and a first light receiving section 119. The first optical system 115 includes a first lens 110-1 and a first diaphragm 112. The first light receiving section 119 includes a first color filter array 116 and a first image capturing element array 118.

The first lens 110-1 is an image forming lens and forms an image on the first light receiving section 119 by means of the G light from the subject. The first diaphragm 112 adjusts the amount of light passing through the first optical system 115. The light passing through the first optical system 115 is limited to those passed through the opening of the first diaphragm 112.

The first color filter array 116 includes a plurality of color filters that selectively transmit the G light. The first color filter array 116 is formed by arranging the plurality of color filters in a pre-set pattern. For example, the first color filter array 116 is formed by arranging the plurality of color filters in a matrix formation.

The first image capturing element array 118 includes a plurality of image capturing elements that receive light from the subject through the first optical system 115. The plurality of image capturing elements included in the first image capturing element array 118 are provided in correspondence with the plurality of color filters included in the first color filter array 116. From the subject light incident on the first color filter array 116, each image capturing element receives G light having been transmitted through a corresponding color filter. Each image capturing element outputs an image capturing signal having an intensity corresponding to the amount of received light.

The second image capturing system 102 includes a second optical system 125 and a second light receiving section 129. The second optical system 125 includes a second lens 120 and a second diaphragm 122. The second light receiving section 129 includes a second color filter array 126 and a second image capturing element array 128.

The second lens 120 is an image forming lens and forms an image on the second light receiving section 129 by means of the subject light. The second diaphragm 122 adjusts the amount of light passing through the second optical system 125. The light passing through the second optical system 125 is limited to those passed through the opening of the second diaphragm 122. Here, the second diaphragm 122 has a larger diaphragm opening than the first diaphragm 112.

The second color filter array 126 includes a plurality of color filters that selectively transmit the B light. The second color filter array 126 is formed by arranging the plurality of color filters in a pre-set pattern. For example, the second color filter array 126 is formed by arranging the plurality of color filters in a matrix formation.

The second image capturing element array 128 includes a plurality of image capturing elements that receive light from the subject through the second optical system 125. The plurality of image capturing elements included in the second image capturing element array 128 are provided in correspondence with the plurality of color filters included in the second color filter array 126. From the subject light incident on the second color filter array 126, each image capturing element receives B light having been transmitted through a corresponding color filter. Each image capturing element outputs an image capturing signal having an intensity corresponding to the amount of received light.

By the second diaphragm 122 having a larger diaphragm opening, the amount of B light incident on the image capturing element can be increased. Therefore, even when the sensitivity of the image capturing element is lower with respect to B light than to G light, the SN ratio of the image signal of B light can be prevented from being outstandingly low due to the improvement in the amount of B light incident on the image capturing element.

The present drawing shows the block configuration of the first image capturing system 101-1 and the second image capturing system 102. The first image capturing system 101-2 has substantially the same optical configuration as the first image capturing system 101-1. The third image capturing system 103 has an optical configuration having a similar optical characteristic to the second image capturing system 102, except that the third image capturing system 103 captures the image of a subject with R light.

Specifically, the third image capturing system 103 can include an image forming lens for forming an image by means of R light instead of the second lens 120 included in the second image capturing system 102, and include a color filter array that selectively transmits R light, instead of the second color filter array 126 included in the second image capturing system 102. The diaphragm opening of the diaphragm included in the third image capturing system 103 may be larger than the diaphragm opening of the first diaphragm 112, in size. The diaphragm opening of the diaphragm included in the third image capturing system 103 may be smaller than or equal to the diaphragm opening of the second diaphragm 122, in size. Alternatively, the diaphragm opening of the diaphragm included in the third image capturing system 103 may be smaller than the diaphragm opening of the second diaphragm 122, or may be substantially equal thereto.

As stated above, by having a small diaphragm opening of the first diaphragm 112, the focal depth of the image capturing with respect to the G light can be made deeper. Since the diaphragm opening of the diaphragm included in the first image capturing system 101 becomes smaller than the diaphragm opening of the diaphragms included in the other image capturing systems, the amount of light usable by the first image capturing system 101 for each image capturing becomes smaller than in the other image capturing systems. However, there are two first image capturing systems 101, a G image signal can be generated by using the image capturing signal G1 and the image capturing signal G2 of the two first image capturing systems 101. Consequently, even when noise intensity increased in the respective first image capturing systems 101 due to the reduction in size of the diaphragm openings, the noise intensity can be relatively reduced by generating the G image signal using the image capturing signal G1 and the image capturing signal G2.

The optical system of each image capturing system is an image forming optical system, and is optically designed so as to form an image onto the corresponding light receiving section by means of the light in the wavelength region used for the corresponding image capturing. For example, the first optical system 115 and the second optical system 125 are optically designed so as to form an image of G light and B light respectively onto the first light receiving section 119 and the second light receiving section 129. Each optical system may have substantially the same focal length and field angle with respect to the wavelength region of light used for the corresponding image capturing. Each optical system can be designed for light in a comparatively narrow wavelength region (e.g., R light, G light, and B light), and so the chromatic aberration correction becomes easier than in the case of designing for light in a comparatively wide wavelength region. Therefore, the image capturing module can be made slim.

A plurality of image capturing elements respectively included in the first light receiving section 119 and the second light receiving section 129 are provided on the same plane. For example, the plurality of image capturing elements included in the first image capturing element array 118 and the plurality of image capturing elements included in the second image capturing element array 128 are formed on the same substrate. For example, the plurality of image capturing elements included in the first image capturing element array 118 and the plurality of image capturing elements included in the second image capturing element array 128 are formed on a surface of the same substrate in the same process. In addition, the plurality of color filters included in the first color filter array 116 and the plurality of color filters included in the second color filter array 126 are also formed on top of the corresponding image capturing elements in the same process. Accordingly, a single light receiving section 109 integrating the first light receiving section 119 and the second light receiving section 129 is manufactured. Each of the image capturing surface of the first light receiving section 119 and the image capturing surface of the second light receiving section 129 functions as a partial region of the image capturing surface of the light receiving section 109. Note that the first light receiving section 119 having the first image capturing element array 118 and the first color filter array 116 as well as the second light receiving section 129 having the second image capturing element array 128 and the second color filter array 126 can be separately manufactured from each other, and then assembled together.

A plurality of image capturing elements respectively included in the first image capturing system 101, the second image capturing system 102 and the third image capturing system 103 are substantially simultaneously exposed to light. When each image capturing element is exposed to light, the reading section 140 reads an image capturing signal from the plurality of image capturing elements. The reading section 140 may include reading circuit(s) formed on the same substrate on which the plurality of image capturing elements are also formed. One reading circuit may be provided for the first image capturing system 101, the second image capturing system 102, and the third image capturing system 103, and the reading circuit may sequentially read image capturing signals from the plurality of image capturing elements respectively included in the first image capturing system 101, the second image capturing system 102, and the third image capturing system 103. Alternatively, the first image capturing system 101, the second image capturing system 102, and the third image capturing system 103 may be provided with their own reading circuit.

The plurality of image capturing elements included in the first image capturing system 101, the second image capturing system 102, and the third image capturing system 103 may be a MOS image capturing element. When each image capturing element is a MOS image capturing element formed on a surface of the same substrate in the same process, the reading section 140 can perform partial reading for each optical system included in each image capturing system. The plurality of image capturing elements included in the first light receiving section 119, and the plurality of image capturing elements included in the second light receiving section 129 may also be implemented by a solid-state image capturing element such as a CCD image capturing element, not limited to the MOS image capturing element.

The image capturing signal G1, the image capturing signal G2, the image capturing signal B, and the image capturing signal R read from the image capturing elements respectively included in the image capturing systems by the reading section 140 are supplied to the image generating section 150. The image generating section 150 generates a brightness signal Y and a color signal C using the image capturing signal G1, the image capturing signal G2, the image capturing signal B, and the image capturing signal R. The processing to generate the brightness signal Y and the color signal C by the image generating section 150 is explained with reference to FIG. 4.

Figure 4:
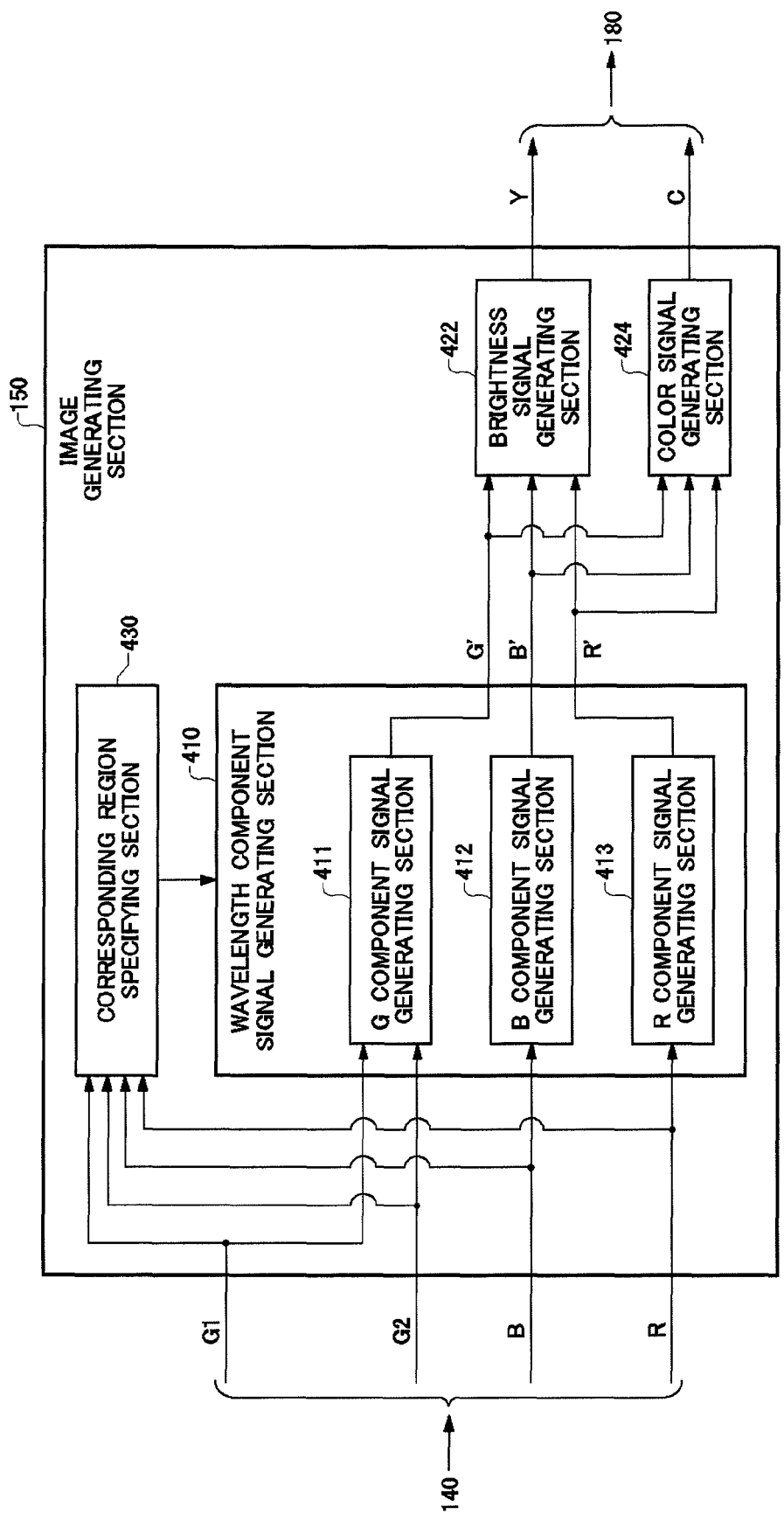
FIG. 4 shows an exemplary block configuration of an image generating section 150.

FIG. 4 shows an exemplary block configuration of an image generating section 150. The image generating section 150 includes a wavelength component signal generating section 410 and a brightness signal generating section 422. The wavelength component signal generating section 410 includes a G component signal generating section 411, a B component signal generating section 412, and an R component signal generating section 413.

The wavelength component signal generating section 410 is supplied with image capturing signals from the reading section 140. Among the image capturing signals, the image capturing signal G1 and the image capturing signal G2 are supplied to the G component signal generating section 411. The G component signal generating section 411 combines the image capturing signal G1 and the image capturing signal G2, to generate a single G component signal (G'). During this process, the G component signal generating section 411 generates the G component signal (G'), by combining the image capturing signal G1 and the image capturing signal G2 by respectively providing parallax correction on these image capturing signals. The wavelength component signal generating section 410 supplies the generated G component signal to the brightness signal generating section 422 and the color signal generating section 424.

The B component signal generating section 412 is supplied with the image capturing signal B. The B component signal generating section 412 generates a B component signal (B') by performing parallax correction on the image capturing signal B, and supplies the generated B component signal to the brightness signal generating section 422 and the color signal generating section 424. The R component signal generating section 413 is supplied with the image capturing signal R. The R component signal generating section 413 generates an R component signal (R') by performing parallax correction on the image capturing signal R, and supplies the generated R component signal to the brightness signal generating section 422 and the color signal generating section 424.

The brightness signal generating section 422 generates a brightness signal Y from the G component signal, the B component signal, and the R component signal, and outputs the brightness signal Y to the recording section 180. The color signal generating section 424 generates a color signal C from the G component signal, the B component signal, and the R component signal, and outputs the color signal C to the recording section 180. Specifically, the brightness signal generating section 422 generates the brightness signal Y according to the expression Y=0.30R+0.59G+0.11B, where "R" represents the R component signal, "G" represents the G component signal, "B" represents the B component signal, and "Y" represents the brightness signal Y. The color signal generating section 424 generates the color signal for Cr and Cb in the color component C, according to the expressions Cr=0.70R−0.59G−0.11B, and Cb=−0.3 OR−0.59G+0.89B, respectively.

As described above, the brightness signal generating section 422 combines the R component signal, the G component signal, and the B component signal, at respective weight coefficients pre-set to the corresponding wavelength regions, to generate the brightness signal Y. The weight coefficient for the G component signal is the largest among the weight coefficients used in generating the brightness signal Y. As stated above, the first optical system 115 has the deepest focal depth of all the optical systems included in the first image capturing system 101, the second image capturing system 102, and the third image capturing system 103. In other words, the first image capturing system 101 performing image capturing using the light in the G wavelength region corresponding to the largest weight has an optical system having the deepest focal depth.

In this way, the image generating section 150 combines the wavelength component signals generated by the plurality of image capturing systems, according to pre-set weights corresponding to the respective wavelength regions, to generate the brightness signal Y of the image signal. Then, in the plurality of image capturing systems, an image capturing system which performs image capturing by means of the light in a wavelength region corresponding to a larger weight includes an optical system having a deeper focal depth.

The image generating section 150 was explained to generate the brightness signal Y and the color signal C and outputs them to the recording section 180. Instead of the brightness signal Y and the color signal C, the image generating section 150 may output the R component signal, the G component signal, and the B component signal to the recording section 180. In this case, the R component signal, the G component signal, and the B component signal may be converted into the brightness signal Y and the color signal C, in the later stage than the image generating section 150. For example, the component signals may be converted into the brightness signal Y and the color signal C and then recorded to the recording section 180. Alternatively, the image may be recorded as the R component signal, the G component signal, and the B component signal, and at the time of supplying them as an image signal to the display apparatus, they may be converted into the brightness signal Y and the color signal C. Still alternatively, the R component signal, the G component signal, and the B component signal may be subjected to signal processing, without being converted into the brightness signal Y and the color signal C at any stage from recording to display of the image.

When converting the R component signal, the G component signal, and the B component signal into the brightness signal Y and the color signal C in the later stage than the image generating section 150, the weights for respective color component signals for the brightness signal Y are defined such that the weight to the G component signal is larger than the weights to the R component signal and to the B component signal. Even when not converting the R component signal, the G component signal, and the B component signal into the brightness signal Y and the color signal C in the later stage than the image generating section 150, the G component signal can be said to be the wavelength component signal that has the greatest contribution to the brightness of the image, since the light in the G wavelength region becomes the largest stimulus to the human eyes. Therefore, whether or not the component signals are converted into a brightness signal as a signal format, the G component signal can still be said to be the wavelength component signal that has the greatest contribution to the brightness of the image of the subject.

In the present embodiment, each image capturing system is explained to have color filters of a primary color system. However, not limited to this, each image capturing system may include any of color filters of a complementary color system of Mg, Ye, and Cy. Even in this case, the image capturing system that generates the wavelength component signal that has the greatest contribution to the brightness in the image of the subject can include the optical system having the deepest focal depth. For example, the image capturing system having the color filter of Ye may include the optical system having the deepest focal depth.

As explained above, the image capturing apparatus 100 includes a plurality of image capturing systems including the first image capturing system 101, the second image capturing system 102, and the third image capturing system 103. The first image capturing system 101, the second image capturing system 102, and the third image capturing system 103 capture the image of a subject by means of light in respectively different wavelength regions, and respectively generate a wavelength component signal representing an image of the light in the corresponding wavelength region. The image generating section 150 combines the wavelength component signals generated by the first image capturing system 101, the second image capturing system 102, and the third image capturing system 103, thereby generating an image signal representing the image of the subject. From among the first image capturing system 101, the second image capturing system 102, and the third image capturing system 103, the first image capturing system 101 that generates the wavelength component signal that has the greater contribution to the brightness in the image of the subject can be said to include the optical system having the deeper focal depth. Therefore, when capturing the image of the subject existing in comparatively a wide range of distance, the resulting image is prevented from looking blurred to a great extent due to the defocusing.

As stated above, the image capturing optical axes respectively of the first image capturing system 101-1, the first image capturing system 101-2, the second image capturing system 102, and the third image capturing system 103 are distant from each other. Therefore, each image capturing system captures the image of the same subject from different perspectives from each other. Consequently, image displacement occurs due to so-called parallax, and so the image position of the same subject does not completely match between the images captured by the image capturing systems. The image displacement amount of each image region is substantially determined according to the position of the optical axis of the optical system included in each image capturing system and the distance up to the subject.

The corresponding region specifying section 430 specifies the image region in which the same subject should be captured both by the first image capturing system 101 and the second image capturing system 102, based on the position of the optical axis of the optical system included in each image capturing system. Specifically, the corresponding region specifying section 430 specifies the corresponding region which is a region in which the image of the same subject is captured, from the image contents of the image represented by the image capturing signal G1 and the image contents of the image represented by the image capturing signal G2. More specifically, the corresponding region specifying section 430 can specify the corresponding region by specifying the corresponding points by the corresponding point matching between the images.

Here, the difference in position of the corresponding points corresponds to the image displacement amount. The image displacement amount in each image region is substantially determined according to the distance between the first image capturing system 101-1 and the first image capturing system 101-2, as well as the distance up to the subject. Therefore, the corresponding region specifying section 430 specifies the distance up to the subject for each image region, based on the position of the optical axis of the first image capturing system 101-1 and the position of the optical axis of the first image capturing system 101-2, as well as the difference in position of the corresponding points.

The corresponding region specifying section 430 specifies the corresponding regions in the image represented by the image capturing signal R and the image represented by the image capturing signal B, based on the distance up to the subject as well as the position of the optical axis of the second lens 120 and the position of the optical axis of the third lens 130. Because the image capturing apparatus 100 includes the first image capturing system 101-1 and the first image capturing system 101-2 performing image capturing by light in the same wavelength region, the corresponding region specifying section 430 can specify the corresponding regions in the first image capturing systems 101 with high accuracy. In addition, the distance up to the subject can also be specified with high accuracy. Therefore, also from the images respectively obtained by the second image capturing system 102 and the third image capturing system 103 respectively having different wavelength regions, the corresponding region specifying section 430 can specify, as a corresponding region, the region in which the same subject as the subject captured in the corresponding region is captured.

The corresponding region specifying section 430 supplies the information representing the specified corresponding region, to the wavelength component signal generating section 410. The G component signal generating section 411 combines the image capturing signal G1 and the image capturing signal G2 by performing the parallax correction based on the corresponding regions. Accordingly, the G component signal generating section 411 generates a single G component signal according to which the subject image is aligned. In addition, the B component signal generating section 412 generates a B component signal according to which the subject image is aligned with respect to the G component signal, by performing parallax correction on the image capturing signal B based on the corresponding region. In addition, the R component signal generating section 413 generates an R component signal according to which the position of the subject image is aligned with respect to the G component signal, by performing parallax correction on the image capturing signal R based on the corresponding region.

In this way, the image generating section 150 can combine wavelength component signals generated by a plurality of image capturing systems, by aligning the subject image on the image based on the optical axis positions of the optical systems respectively included in the plurality of image capturing systems. Therefore, the image generating section 150 can generate an image from a so-called single perspective, i.e., an image in which parallax has been substantially resolved.

As stated above, the image displacement amount of each image region is proportional to the distance between the first image capturing system 101 and the second image capturing system 102, as well as the distance up to the subject, and so the image displacement amount can be specified, if the distance up to the subject can be specified. The corresponding regions can be specified by the image displacement amount. Therefore, the corresponding region specifying section 430 can also specify the corresponding regions based on the distance measurement information and the position of the image capturing optical axis of each image capturing system, not limited to directly specifying the corresponding regions by the above-explained corresponding point matching. The distance measurement information may be obtained from an external distance measuring device included in the image capturing apparatus 100.

Figure 5:
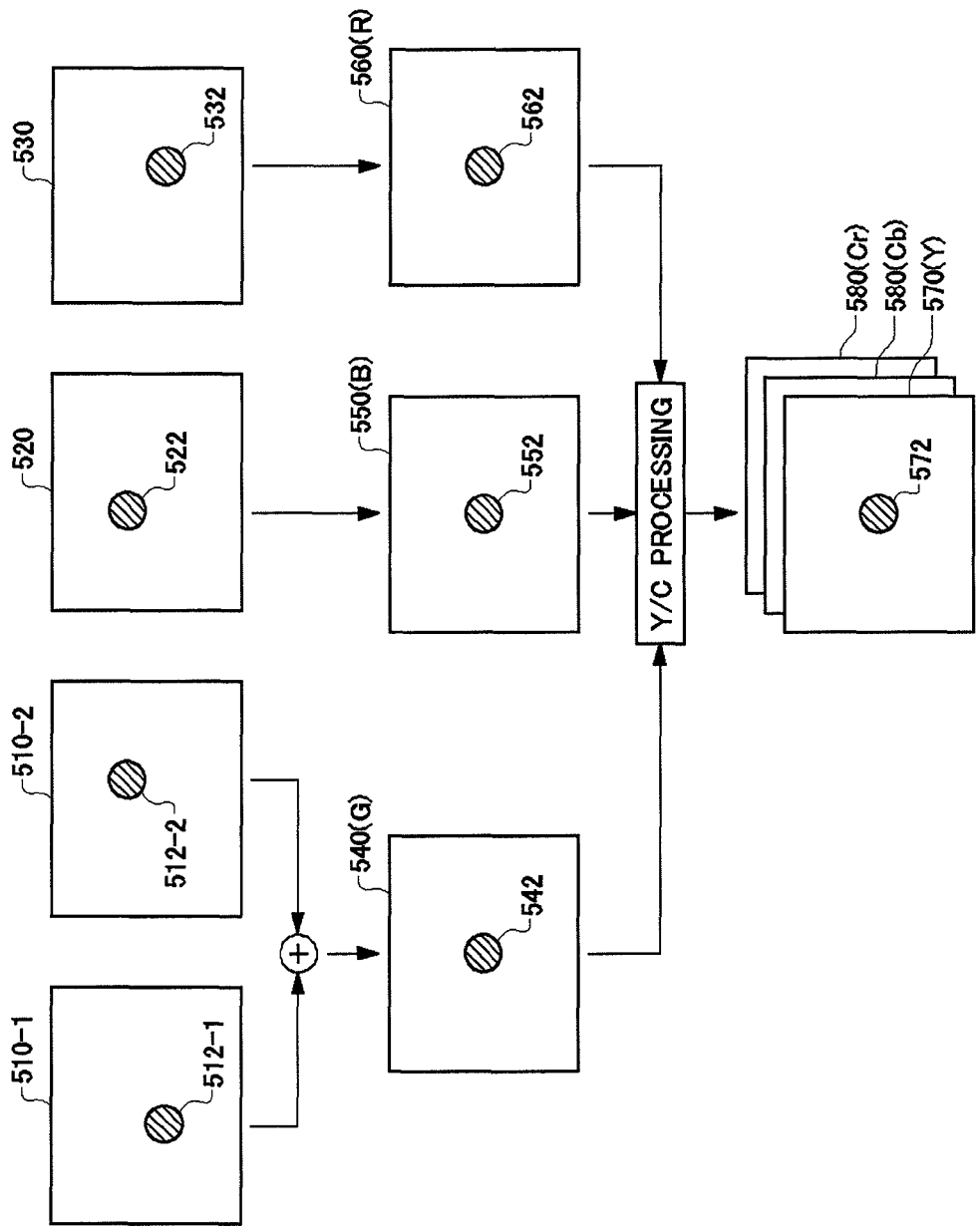
FIG. 5 shows exemplary image processing on an image captured by each image capturing system.

FIG. 5 shows exemplary image processing on an image captured by each of the first image capturing system 101, the second image capturing system 102, and the third image capturing system 103. Here, exemplary image processing is schematically explained taking an example of the image of the subject existing on the extension line drawn from the center of the lens apparatus in the direction of the optical axis. Here, the subject is referred to as the subject on the axis.

Here, the G component image 510-1 and the G component image 510-2 are assumed to be images respectively represented by the image capturing signal G1 and the image capturing signal G2, and the B component image 520 and the R component image 530 are assumed to be images respectively represented by the image capturing signal B and the image capturing signal R. The corresponding region 512-1 and the corresponding region 512-2 are assumed to be the corresponding regions on the subject on the axis specified by the corresponding region specifying section 430 from the G component image 510. Moreover, the corresponding region 522 and the corresponding region 532 are assumed to be the corresponding regions in which the image of the subject on the axis should be captured.

When observing the subject from the image capturing apparatus 100, the first image capturing system 101-1 and the first image capturing system 101-2 are positioned respectively at the upper right and at the lower left in relation to the center of the image region. Therefore, the corresponding region 512-1 is specified at the lower left in relation to the center of the image region. In addition, the corresponding region 512-2 is specified at the upper right in relation to the center of the image region.

In addition, the second lens 120 is positioned at the lower right in relation to the center of the lens apparatus, and the third lens 130 is positioned on the upper left in relation to the center of the lens apparatus. Therefore, the corresponding region 522 is specified at the upper left of the center of the image region. In addition, the corresponding region 532 is specified at the lower right in relation to the center of the image region.

The G component signal generating section 411 combines the image capturing signal G1 and the image capturing signal G2, thereby generating the G component signal representing the G component image 540. During this process, the G component signal generating section 411 combines the image capturing signal of the corresponding region 512-1 from the image capturing signal G1 with the image capturing signal of the corresponding region 512-2 from the image capturing signal G2, thereby generating the G component signal of the central region 542 of the G component image 540.

In addition, the B component generating section 412 generates the B component signal representing the B component image 550, from the image capturing signal B. During this process, the B component signal generating section 412 generates the image capturing signal of the corresponding region 522 from among the image capturing signal B, as the B component signal of the central region 552 of the B component image 550. Likewise, the R component signal generating section 413 generates the R component signal representing the R component image 560, from the image capturing signal R. During this process, the R component signal generating section 413 generates the image capturing signal of the corresponding region 532 from among the image capturing signal R as the R component signal of the central region 562 of the R component image 560. Accordingly, the wavelength component signal generating section 410 generates the R component signal, the G component signal, and the B component signal, according to which the subject image of the same subject is aligned.

Then, the brightness signal generating section 422 and the color signal generating section 424 perform Y/C processing, using the R component signal, the G component signal, and the B component signal. As stated above, the brightness signal generating section 422 generates the brightness signal Y representing the Y component image 570. The color signal generating section 424 generates the color signal C representing the C component image 580 for Cb and Cr. The image of the subject on the axis will be positioned on the central region 572 of the image region of the Y component image 570 and the C component image 580. Accordingly, the image generating section 150 can generate an image whose perspective is the center of the lens apparatus.

In this way, the image generating section 150 generates a single wavelength component signal by combining the wavelength component signals respectively generated by a plurality of first image capturing systems 101. Then, the image generating section 150 combines the generated single wavelength component signal and the other wavelength component signals, thereby generating an image signal.

Note that instead of generating an image whose perspective is the center of the lens apparatus, an image whose perspective is the position of any of the first image capturing system 101, the second image capturing system 102, and the third image capturing system 103 may be generated. For example, when generating the image captured by the first image capturing system 101-1, the wavelength component signal generating section 410 may combine the image capturing signal of the corresponding region 512-1 and the image capturing signal of the corresponding region 512-2, to generate a G component signal at the position of the corresponding region 512-1. Moreover, the image capturing signals in the corresponding region 522 and the corresponding region 532 can be generated respectively as a B component signal and a G component signal at the position of the corresponding region 512-1. The image at any perspective can be generated in the similar manner.

According to the image capturing apparatus 100 explained above with reference to FIG. 1 through FIG. 5, one or more image capturing systems 101 performing image capturing using G light have an optical system having a focal depth deeper than the optical systems of the other image capturing systems. For this reason, even when the subject exists in a comparatively wide range of distance, an image with little blur can be provided.

In the above description, so as to facilitate the explanation, the diaphragm opening of the first diaphragm 112 is assumed to be narrower than the diaphragm opening of the second diaphragm 122. In other words, a first image capturing system 101 generating a wavelength component signal that has a greater contribution to the brightness is assumed to include an optical system having a smaller diaphragm. Not limited to the diaphragm opening, the focal depth of the first image capturing system 101 may be designed using the F value as an index. For example, a first image capturing system 101 generating a wavelength component signal that has a greater contribution to the brightness may include an optical system having a larger F value.

As the F value gets larger for example by reducing the diaphragm opening, the optical system will get darker, leading to increase in SN ratio for the optical system itself. However, the image capturing apparatus 100 is provided with more first image capturing systems 101 generating the wavelength component signal having the greatest contribution to the brightness than the other image capturing systems, and the image generating section 150 generates a single image signal from the image capturing signals from the plurality of first image capturing systems 101. This helps relatively reduce noise.

Figure 6:
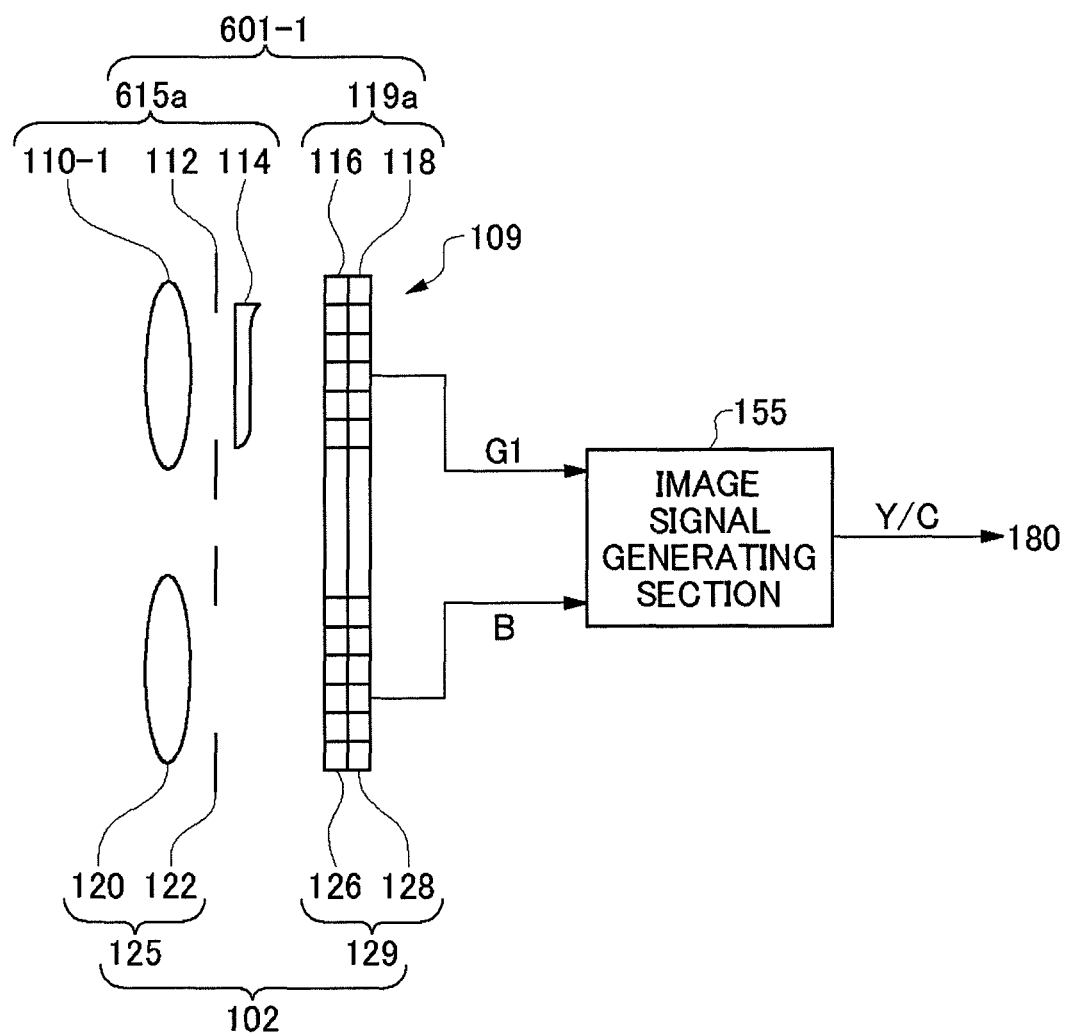
FIG. 6 shows a different exemplary block configuration of the image capturing module.

FIG. 6 shows a different exemplary block configuration of the image capturing module of the image capturing apparatus 100. This exemplary configuration includes a first image capturing system 601-1 instead of the first image capturing system 101-1. In addition, this exemplary configuration includes an image signal generating section 155 instead of the image signal generating section 170. The image signal generating section 155 is explained with reference to FIG. 7.

The first image capturing system 601-1 includes an optical system 615 and a first light receiving section 119. The optical system 615 includes a first lens 110-1, a first diaphragm 112, and a wavefront coding section 114. The first light receiving section 119 includes a first color filter array 116 and a first image capturing element array 118.

Among the optical elements included in the first image capturing system 601-1, the optical element(s) assigned the same reference numeral as optical element(s) included in the first image capturing system 101-1 has/have substantially the same configuration as the corresponding optical element(s). Therefore, the optical element(s) is/are not explained in the following explanation except for the differences from the corresponding optical element(s). In the first image capturing system 101, the diaphragm opening of the first diaphragm 112 is smaller than the diaphragm opening of the second diaphragm 122. As opposed to this, in the first image capturing system 601-1, the diaphragm opening of the first diaphragm 112 may have substantially the same size as the diaphragm opening of the second diaphragm 122. However, the focal depth of the first image capturing system 601-1 is effectively deeper due to the inclusion of the wavefront coding section 114, than in the case where there is no wavefront coding section 114.

The wavefront coding section 114 changes the wavefront of the image formed by the first lens 110 onto the first light receiving section 119. For example, the wavefront coding section 114 may be a phase plate having a three dimensionally curved surface. For example, the wavefront coding section 114 has an optically functioning surface represented by a cubic equation with respect to each coordinate value of the coordinate system belonging to the Cartesian coordinate system whose origin is the optical axis. Concretely, when assuming that the two axes orthogonal to the optical axis of the first lens 110 are X and Y, the wavefront aberration by the wavefront coding section 114 is proportional to $(X^3+Y^3)$.

Due to the wavefront coding of the wavefront coding section 114, the light from the object point is widened, and the first light receiving section 119 will receive the light flux widened by the wavefront coding section 114. However, when comparing to the case of not having the wavefront coding section 114, the dependency of the spread width of the light flux to the position in the optical axis direction gets smaller as it approaches the first light receiving section 119. Therefore, for the light from the object point in a comparatively wide range in the optical axis direction, the spread width of the light flux will become substantially the same in the vicinity of the first light receiving section 119. In this way, the optical system 615 can provide substantially the same spread to the light from the subject positioned in a pre-set range of distance in the optical axis direction.

For this reason, by providing processing to correct the spread to the image obtained by the first image capturing system 601-1, the subject image can be restored to a clear subject image, as long as the distance up to the subject is within a certain range. Consequently, when comparing to the second image capturing system 102 including the second optical system 125 being an image forming optical system, the first image capturing system 601-1 can be said to be an image capturing system having a deeper focal depth.

The other first image capturing system may have an optical configuration similar to that of the first image capturing system 601-1. The other first image capturing system may have the same optical configuration as the first image capturing system 101-2 explained above with reference to FIG. 1 to FIG. 5. In other words, according to the image capturing apparatus 100 having the present configuration, the optical system having an image capturing system performing image capturing by means of light in any wavelength region other than the G wavelength region is an image forming optical system. One or more image capturing systems performing image capturing by G light, from among the plurality of image capturing systems included in the image capturing apparatus 100, include an optical system providing substantially the same spread to the light from the subject positioned in a pre-set range of distance in the optical axis direction.

The wavefront coding section 114 may be any optical element as long as it can perform wavefront coding so that the spread of the light flux becomes substantially constant in the vicinity of the first light receiving section 119. For example, the wavefront coding section 114 may include an optical functioning surface in a shape different from the above-explained three dimensionally curved surface. The other examples of the wavefront coding section 114 may include a gradient-index wavefront coding lens that performs wavefront coding by means of change in gradient index, and a wavefront coding element such as a liquid crystal element modulating the phase distribution of light.

Alternatively, the spread of the light flux can be made substantially constant in the vicinity of the first light receiving section 119, by adopting a lens having a lower image forming power in the central area including the optical axis than the periphery instead of the first lens 110, as the optical element providing substantially the same spread effect as the optical system 615. Still alternatively, the spread of the light flux can be made substantially constant in the vicinity of the first light receiving section 119, by adopting a lens having different aberrations to light passing different positions in the diameter direction on the pupil surface instead of the first lens 110.

Figure 7:
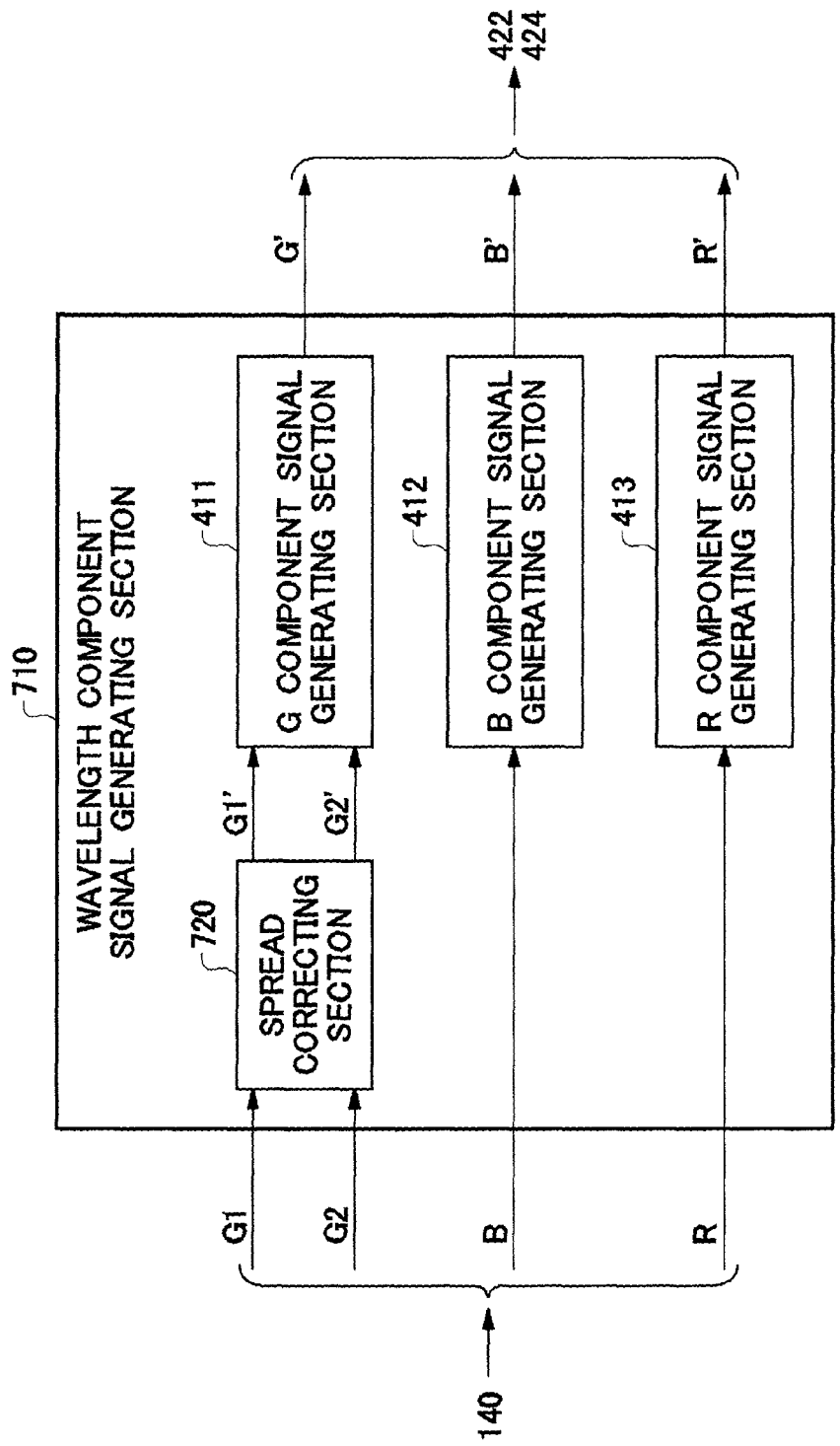
FIG. 7 shows an exemplary block configuration of a wavelength component signal generating section 710.

FIG. 7 shows an exemplary block configuration of a wavelength component signal generating section 710 according to the present image capturing module. The image signal generating section 155 has a configuration similar to the image signal generating section 170, except that the image generating section 150 includes a wavelength component signal generating section 710 instead of the wavelength component signal generating section 410. The following only explains the differences.

As stated above, the image represented by the image capturing signal G1 and the image capturing signal G2 is blurred due to the spread of the light flux. In addition to the G component signal generating section 411, the B component signal generating section 412, and the R component signal generating section 413, the wavelength component signal generating section 710 further includes a spread correcting section 720 that corrects blur generated due to the spread of the light flux.

The spread correcting section 720 performs, on the image capturing signal G1 and the image capturing signal G2, restoring processing to restore the blurred object point image provided by the optical system 615, to substantially a point image, thereby generating an image capturing signal G1' and an image capturing signal G2'. For example, the spread correcting section 720 adapts, to the image capturing signal Gr and the image capturing signal G2' a restoring filter for restoring a blurred image to a point image.

An example of the restoring filter is a deconvolution filter that cancels blur generated by the wavefront coding section 114. The deconvolution filter may be those that can perform inverse conversion of the optical transmittance function of the optical system 615 so as to restore the blurred image provided by the optical system 615 to a point image. The restoring filter may be implemented by a digital filter based on the inverse filtering method.

The spread correcting section 720 supplies the image capturing signal G1' and the image capturing signal G2' to the G component signal generating section 411. The processing performed in the G component signal generating section 411 is the same as explained with reference to FIG. 1 through FIG. 5, except that the image capturing signal G1' and the image capturing signal G2' are to be processed, and so is not explained in the following. Needless to say, the spread correcting section 720 may not perform the spread correction on the image capturing signal G2 when the image capturing system generating the image capturing signal G2 includes an optical configuration similar to that of the first image capturing system 101-2.

According to the image capturing apparatus 100 explained with reference to FIG. 6 and FIG. 7, too, an image with little blur can be provided even when the subject exists in a comparatively wide range of distance. In FIG. 1 through FIG. 7, an image capturing system that performs image capturing in partial wavelength region light such as G light has been used as an example of the image capturing system that generates the wavelength component signal that has a greater contribution to the brightness in the image of the subject. However not limited to the image capturing system performing image capturing by G light, an image capturing system performing image capturing by light in a comparatively wider wavelength region such as from a blue wavelength region to a red wavelength region. When capturing an image of light covering a wide wavelength region using an image forming optical system, the resolution is affected by the chromatic aberration, and so depends on the wavelength region. However, if adopting the optical configuration explained above with reference to FIG. 6 and FIG. 7, the spread of the light flux does not depend on the wavelength region as much as the resolution in the image forming optical system does. Therefore, if adopting an image capturing system performing image capturing by light covering such a wide wavelength region as the image capturing system generating a wavelength component signal having a greater contribution to the brightness, it may be occasionally beneficial to adopt the optical configuration explained with reference to FIG. 6 and FIG. 7 than the optical configuration including the image forming optical system.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An image capturing module comprising:
a plurality of image capturing systems, each including an optical system and capturing an image of a subject by light in a wavelength region different from each other to generate a wavelength component signal representing an image of light in the corresponding wavelength region; and
an image generating section that combines the wavelength component signals generated by the plurality of image capturing systems thereby generating an image signal representing an image of the subject, wherein
a plurality of first image capturing systems, from among the plurality of image capturing systems, which generate a wavelength component signal having a greater contribution to brightness in the image of the subject, include an optical system having a deeper focal depth, and
the plurality of first image capturing systems are the greatest in number among the plurality of image capturing systems, and include optical systems having a smallest diaphragm among the plurality of image capturing systems.

2. The image capturing module according to claim 1, wherein
the image generating section generates a brightness signal of the image signal, by combining the wavelength component signals generated by the plurality of image capturing systems according to pre-set weights corresponding to respective wavelength regions, and
the weight corresponding to a wavelength region of light captured by the first image capturing system is largest among the weights corresponding to wavelength regions of light captured by the plurality of image capturing systems.

3. The image capturing module according to claim 1, wherein
the image generating section generates a single wavelength component signal by combining the wavelength component signals generated by the plurality of first image capturing systems, and generates the image signal by combining the single wavelength component signal with the other wavelength component signals.

4. The image capturing module according to claim 1, wherein
each of the plurality of first image capturing systems includes an optical system having a larger F value among optical systems of the plurality of image capturing systems.

5. The image capturing module according to claim 1, wherein
the plurality of first image capturing systems respectively captures light in G wavelength region, and
at least two image capturing systems other than the first image capturing systems among the plurality of image capturing systems respectively captures light in R and B wavelength regions.

6. The image capturing module according to claim 1, wherein
any optical system included in image capturing systems capturing light in wavelength regions other than the G wavelength region is an image forming optical system, and
the one or more image capturing systems capturing light in the G wavelength region includes an optical system providing substantially the same spread to light from the subject positioned in a pre-set range of distance in an optical axis direction.

7. The image capturing module according to claim 1, wherein
the image generating section combines the wavelength component signals generated by the plurality of image capturing systems, by aligning a subject image on the image based on optical axis positions of the optical systems respectively included in the plurality of image capturing systems.

8. An image capturing apparatus comprising:
the image capturing module according to claim 1; and
a lens barrel that houses the image capturing module therewithin, wherein the image capturing apparatus captures an image of the subject by the image capturing module.

9. The image capturing apparatus according to claim 8, further comprising
a recording section that records the image signal generated by the image signal generating section.

10. The image capturing apparatus according to claim 9, wherein
the recording section includes an external memory provided detachable to the image capturing apparatus.

11. The image capturing module according to claim 1, wherein
the image generating section specifies a corresponding region in which the same subject should be captured, based on a position of an optical axis of the optical system included in each of the plurality of image capturing systems, and combines the wavelength component signals generated by the plurality of image capturing systems, by aligning a subject image on the image based on the corresponding region.

12. The image capturing module according to claim 1, wherein
the plurality of first image capturing systems respectively captures light in Ye wavelength region, and
at least two image capturing systems other than the first image capturing systems among the plurality of image capturing systems respectively captures light in Mg and Cy wavelength regions.

* * * * *